United States Patent
Wallet (10) Patent No.: US 7,409,975 B2
(45) Date of Patent: Aug. 12, 2008

(54) APPARATUS FOR ENHANCING LIGHT REFLECTIVE PROPERTIES OF TIRE SIDEWALLS

(75) Inventor: Bill J. Wallet, Marshallville, OH (US)

(73) Assignee: Bridgestone Firestone North American Tire, LLC, Nashville, TN (US)

( * ) Notice: Subject to any disclaimer, the term of this patent is extended or adjusted under 35 U.S.C. 154(b) by 490 days.

(21) Appl. No.: 11/128,894

(22) Filed: May 13, 2005

(65) Prior Publication Data

US 2006/0254689 A1 Nov. 16, 2006

(51) Int. Cl.
*B60C 13/00* (2006.01)
*B60C 13/02* (2006.01)

(52) U.S. Cl. ............... 152/523; D12/500; D12/502; D12/604; D12/605

(58) Field of Classification Search ............... 152/523; D12/500, 502, 604, 605
See application file for complete search history.

(56) References Cited

U.S. PATENT DOCUMENTS

| | | | |
|---|---|---|---|
| 4,343,342 A | 8/1982 | McDonald | |
| 5,058,647 A | 10/1991 | Gartland et al. | |
| 5,645,660 A | 7/1997 | Attinello et al. | |
| 5,645,661 A | 7/1997 | Clementz et al. | |
| 5,807,446 A | 9/1998 | Ratliff, Jr. | |
| 6,053,228 A * | 4/2000 | Baker | 152/523 |
| 2003/0037854 A1 | 2/2003 | Suzuki | |
| 2003/0140999 A1 | 7/2003 | Smith et al. | |

* cited by examiner

*Primary Examiner*—Justin Fischer
(74) *Attorney, Agent, or Firm*—James A. Oliff; Thomas R. Kingsbury (57) ABSTRACT

An apparatus for enhancing the light reflective properties of a sidewall of a pneumatic tire. The tire may include a pair of sidewalls radially extending from a central axis of rotation of the tire. The sidewalls may include an inner diameter and an outer diameter defining an external surface. At least one of the sidewalls may include an annular band formed on the external surface of the sidewall. The annular band may include a pair of spaced apart band edge surfaces, each including a first edge and a sinusoidal second edge that may help to reduce sidewall undulations and enhance the reflective properties of the sidewall, so that indicia formed on the annular band may be legible to a viewer. Additionally, the sidewalls may also include any type of indicia.

30 Claims, 6 Drawing Sheets

APPARATUS FOR ENHANCING LIGHT REFLECTIVE PROPERTIES OF TIRE SIDEWALLS

BACKGROUND

Exemplary embodiments of the invention relate to the field of tires. In particular, exemplary embodiments of the invention relate to enhancing/manipulating light reflective properties of sidewalls of pneumatic tires.

Pneumatic tires may be constructed from a radial body, which is attached to a bead structure, to form a toroidal shape when inflated. The bead structure may include a plurality of steel wires or cables, which, under tension, fit around the design rim of a tire for a vehicle. The radial body ply may be wrapped circumferentially with at least one steel belt. The tread, which contacts the road surface, may be formed outside of the at least one steel belt. The tread may be connected to the bead structure by a relatively thin section of sidewall rubber.

Vehicle tires having the above construction may affect various aspects of the vehicle's operation, such as the smoothness of the ride, the handling characteristics of the vehicle, the durability of the tire, and gasoline mileage. For example, decreasing rolling resistance of the tire may increase the gasoline mileage of the vehicle. Rolling resistance may be decreased in forming the sidewalls of the tire as mono-ply structures covered by a thin rubber stock layer. However, as a result, cosmetically unappealing sidewall undulations may be formed in the sidewalls of the tire. These sidewall undulations may be viewed as defects in the sidewalls of the tire.

Related art tire sidewalls include annular indicia bands to assist in concealing the unsightly sidewall undulations. These indicia bands may include numerals, letters, symbols and/or other characters to enhance the appearance of the tire sidewalls, as well as provide information. The information provided by the indicia may include information about a tire manufacturer and/or a tire, such as the manufacturer's name, a product name, tire specifications, a warning label, and/or other identifying information.

Although all of the information provided by the indicia may not always be substantively useful, the indicia may be provided on the sidewalls of the tire so as to provide an aesthetic and/or a decorative component, and may be viewed by any of the users at any time. Those viewing the indicia may include a tire manufacturer, a buyer, an end user, and/or any other person that handles and/or views the tire. However, the indicia may not always be legible to the users due to light reflective properties and/or light absorbent properties of the sidewalls of the tires.

SUMMARY

In particular, when light contacts indicia located on an external side surface of the tire, the light is not properly diffused, so that the indicia do not adequately camouflage sidewall undulations. A large proportion of the sidewall undulations may occur within the indicia band located on the sidewall of the tire. Therefore, surface geometries of the indicia may be manipulated to maximize light diffusion characteristics of the indicia band to reduce the appearance of sidewall undulations. As the surface geometry of the indicia is manipulated, the eyes of those viewing the indicia may be visually tricked into not seeing the sidewall undulations.

Exemplary embodiments of a pneumatic tire defining a central axis of rotation may include a pair of sidewalls radially extending from the central axis of rotation of the tire. Each of the sidewalls may include an inner diameter and an outer diameter defining an external surface. At least one of the sidewalls may include an annular band formed on its external surface. The annular band may include a pair of spaced apart band edge surfaces. At least one of the band edge surfaces may include a first edge and a sinusoidal second edge, the first edge and the second edge being substantially concentric to the inner diameter and the outer diameter of the sidewall.

Exemplary embodiments of a pneumatic tire defining a central axis of rotation may also include a pair of sidewalls extending radially from the central axis of rotation of the tire. Each of the sidewalls may include an inner diameter and an outer diameter defining an external surface. At least one of the sidewalls may include an annular band formed on its external surface. The annular band may include a pair of spaced apart band edge surfaces. At least one of the band edge surfaces may include varying widths as measured in radial directions from the central axis of rotation, the first edge and the second edge being substantially concentric to the inner diameter and the outer diameter of the sidewall.

Exemplary embodiments of a sidewall of a pneumatic tire defining a central axis of rotation may also include an inner diameter, a larger concentric outer diameter, an external sidewall surface defined by the inner diameter and the outer diameter, and an annular indicia band formed on the external sidewall surface extending from the central axis of rotation. The annular band may include a pair of spaced apart band edge surfaces, and at least one of the band edge surfaces may include varying widths as measured in a radial direction from the central axis of rotation.

These and other features and advantages of the invention are described in, or are apparent from, the following detailed description of various exemplary embodiments of the systems and methods according to this invention.

BRIEF DESCRIPTION OF THE DRAWINGS

Various exemplary details are described herein, with reference to the following figures, wherein.

DETAILED DESCRIPTION OF EMBODIMENTS

Exemplary embodiments according to the present invention are described below with reference to the above drawings, in which like reference numerals designate like components. In addition, the following terms used herein are defined as set forth below:

"Axial" and "axially" refer to lines or directions that are parallel to the central axis of rotation of the tire.

"Central axis of rotation" refers to a line or direction perpendicular to a plane of the page in FIGS. 1-4.

"Ply" is a continuous layer of rubber-coated parallel cords which forms a unit of a tire carcass. The plies are made of cord, fiberglass, steel, or structural fabric.

"Radial" and "radially" refer to directions radially toward or away from the axis of rotation of the tire.

"Sidewall" means that portion of a tire between the tread and the bead.

Because tire sidewalls are formed relatively thin to reduce rolling resistance, undulations may be formed on the sidewalls of the tire. These sidewall undulations may be unsightly and may be viewed as defects in the sidewalls of the tires. However, the defects are merely visual flaws that do not impact the overall tire performance. Therefore, a number of patents and patent publications disclose tire structures including indicia bands that may be decorative, may convey information and/or may attempt to camouflage the sidewall undulations. For example, U.S. Patent Application Publication No. 2003/0140999 A1, hereby incorporated by reference in its entirety, discloses a pneumatic tire, wherein an outer sidewall has a whitewall or colored wall portion including indicia to enhance aesthetic appearance. U.S. Pat. No. 5,058,647 and U.S. Patent Application Publication No. 2003/0037854 A1, hereby incorporated by reference in their entirety, disclose pneumatic tires, wherein a sidewall has a decorative design that also conveys information. Further, U.S. Pat. No. 4,343,342, hereby incorporated by reference in its entirety, discloses a pneumatic tire, wherein each sidewall has an annular band and indicia markings to convey information.

U.S. Pat. No. 5,645,660 (the '660 patent), U.S. Pat. No. 5,645,661 (the '661 patent), and U.S. Pat. No. 5,807,446, hereby incorporated by reference in their entirety, disclose other tire sidewall designs, in which indicia bands and indicia are disposed on tire sidewalls to provide decoration and information. However, these patents also disclose that the indicia and indicia bands include surface geometries that attempt to camouflage sidewall undulations. In particular, the '660 and '661 patents disclose that the surface geometries of the indicia bands and indicia are structured so as to hide surface undulations by deflecting/reflecting impinging light.

In general, applying indicia to tire sidewalls draws attention away from sidewall undulations. Therefore, approaches, such as those described in the publications and the patents discussed above, help to camouflage the sidewall undulations. However, the sidewall undulations may still be revealed due to the light reflection and adsorption of the indicia and the tire sidewalls.

Exemplary embodiments of the present tire construction may provide an indicia surface geometry that creates maximum light diffusion to camouflage sidewall undulations.

The following detailed description is directed to exemplary pneumatic tires having two externally facing sidewalls. Although the detailed description is directed to a first externally facing sidewall, it should be appreciated that the description is provided for ease of understanding and familiarity only, and does not exclude a second externally facing sidewall having substantially similar configuration and features as the first externally facing sidewall.

Figure 1:
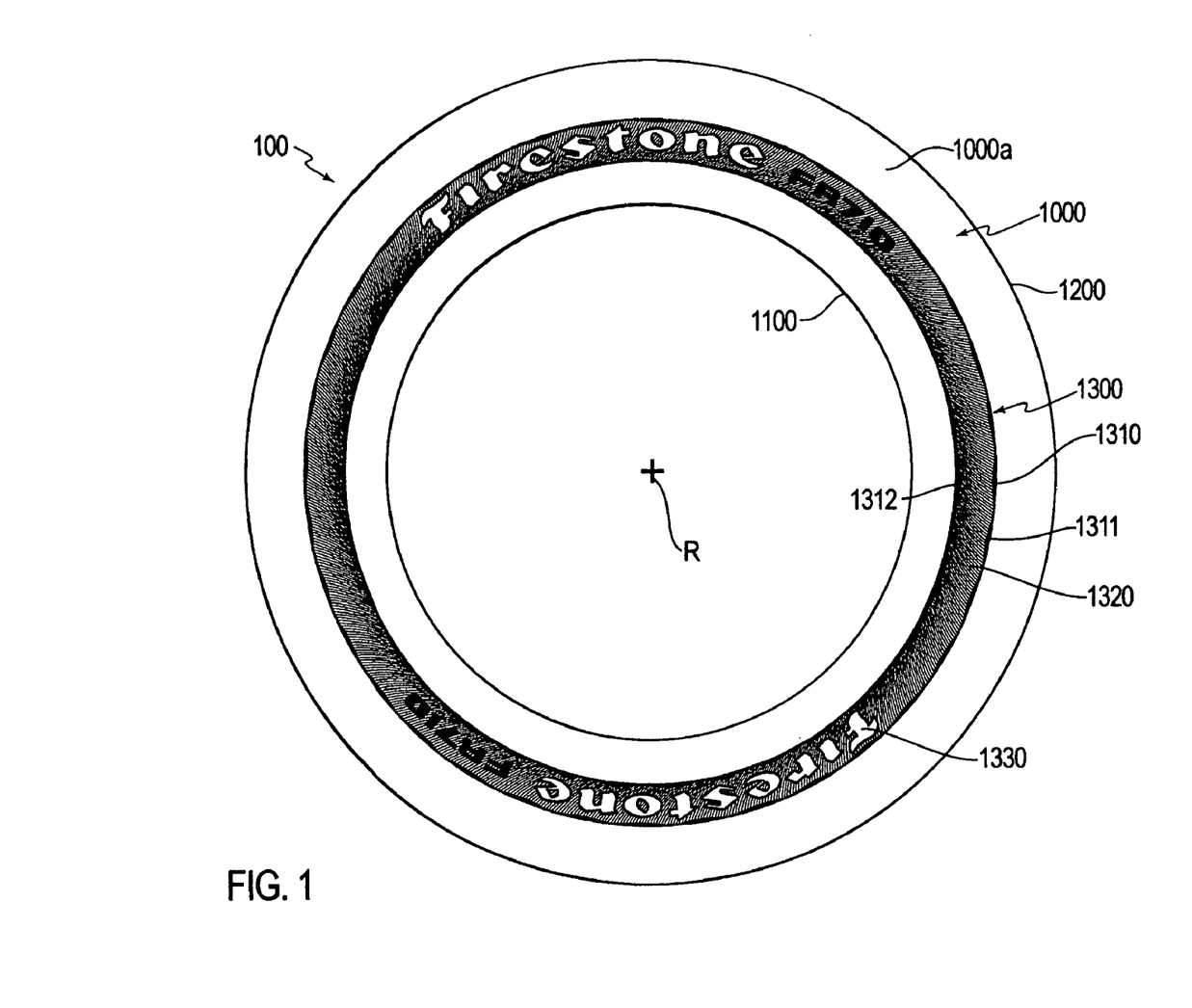
FIG. 1 is a plan view of an exemplary sidewall of a tire.

FIG. 1 is a plan view of an exemplary sidewall of a tire. The tire 100 may include a sidewall 1000 having an external surface 1000a and radially extending from a central axis of rotation R of the tire 100, an inner diameter 1100, an outer diameter 1200, and an annular ring or band 1300 formed on the external surface 1000a of the sidewall 1000. The annular band 1300 may include several types of indicia to help conceal surface imperfections, such as sidewall undulations (not shown).

As shown in FIG. 1, the annular band 1300 may be defined by a pair of spaced apart, substantially concentric projecting band edge surfaces 1310 as a type of indicia that may help to conceal the undulations on the external surface 1000a of the sidewall 1000. The band edge surfaces 1310 may project from the external surface 1000a of the sidewall 1000 in an axial direction of the tire 100. Each of the band edge surfaces 1310 may be defined by a substantially circular first edge 1311 concentric with the inner diameter 1100 and the outer diameter 1200 of the sidewall 1000, and a substantially sinusoidal second edge 1312. As a result, the band edge surfaces 1310 may include varying widths as measured along radial directions. The radial directions may extend in directions substantially perpendicular to the central axis of rotation R of the tire 100.

As shown in FIG. 1, the annular band 1300 may also include a plurality of spaced apart ridges or splines 1320 as another type of indicia that may help to conceal the undulations on the external surface 1000a of the sidewall 1000. Each ridge 1320 may extend between the band edge surfaces 1310 along the circumference of the annular band 1300. Each ridge 1320 may also project from the external surface 1000a of the sidewall 1000 in the axial direction of the tire 100. Each ridge 1320 may also be oriented at an angle relative to a radial direction and substantially parallel to an adjacent ridge 1320. The lengths of the ridges 1320 may also vary due to the varying distances between the second edges 1312 of the pair of band edge surfaces 1310.

As shown in FIG. 1, the annular band 1300 may also include lettering 1330 as another type of indicia that may help to conceal the undulations on the external surface 1000a of the sidewall 1000. The lettering may extend between the band edge surfaces 1310 along the circumference of the annular band 1300. The lettering 1330 may also project from the external surface 1000a of the sidewall 1000 in an axial direction of the tire 100.

Figure 2:
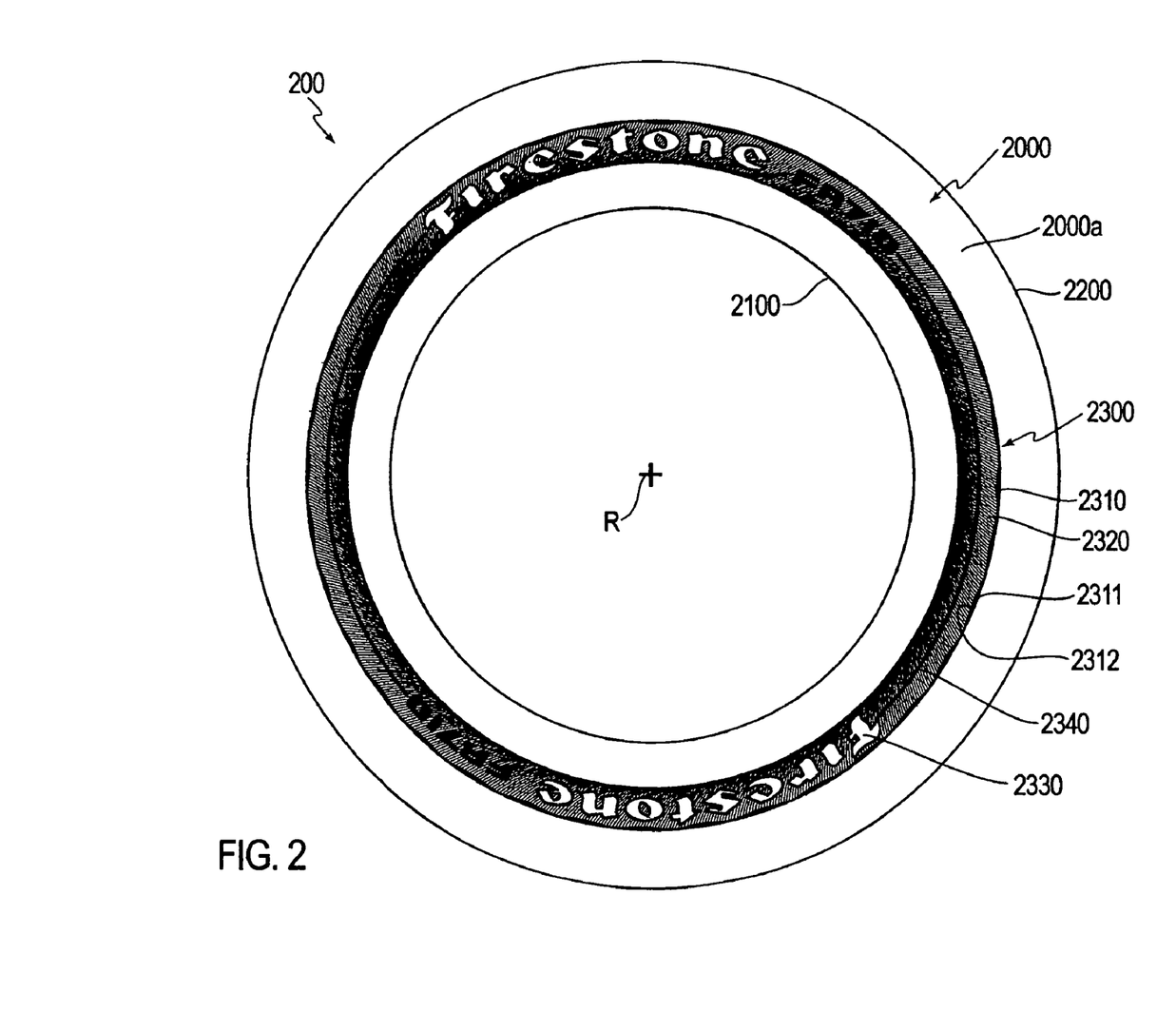
FIG. 2 is a plan view of another exemplary sidewall of a tire.

FIG. 2 is a plan view of another exemplary sidewall of a tire. The tire 200 may include a sidewall 2000 having an external surface 2000a, an inner diameter 2100, an outer diameter 2200, and an annular ring or band 2300 formed on the external surface 2000a of the sidewall 2000. The annular band 2300 may include several types of indicia to help conceal undulations (not shown).

As shown in FIG. 2, the annular band 2300 may be defined by a pair of spaced apart, substantially concentric projecting band edge surfaces 2310 as a type of indicia that may help to conceal the undulations on the external surface 2000a of the sidewall 2000. The band edge surfaces 2310 may project from the external surface 2000a of the sidewall 2000 in an axial direction of the tire 200, the central axis of rotation R being perpendicular to a plane of the page in FIG. 2. Each of the band edge surfaces 2310 may be defined by a substantially circular first edge 2311 concentric with the inner diameter 2100 and the outer diameter 2200 of the sidewall 2000, and a substantially sinusoidal second edge 2312. As a result, the band edge surfaces 2310 may include varying widths as measured along radial directions. The radial directions may extend in directions substantially perpendicular to the central axis of rotation R of the tire 200.

As shown in FIG. 2, the annular band 2300 may also include a plurality of spaced apart ridges 2320 as another type of indicia that may help to conceal the undulations on the external surface 2000a of the sidewall 2000. Each ridge 2320 may extend between the band edge surfaces 2310 along the circumference of the annular band 2300. Each ridge 2320 may also project from the external surface 2000a of the sidewall 2000 in the axial direction of the tire 200. Each ridge 2320 may also be oriented at an angle relative to a radial direction and substantially parallel to an adjacent ridge 2320. The lengths of the ridges 2320 may also vary due to the varying distances between the second edges 2312 of the pair of band edge surfaces 2310.

As shown in FIG. 2, the annular band 2300 may also include lettering 2330 as another type of indicia that may help to conceal the undulations on the external surface 2000a of the sidewall 2000. The lettering may extend between the band edge surfaces 2310 along the circumference of the annular band 2300. The lettering 2330 may also project from the external surface 2000a of the sidewall 2000 in the axial direction of the tire 200.

The annular band 2300 may also include at least one central concentric protrusion 2340 as another type of indicia that may help to conceal the undulations on the external surface 2000a of the sidewall 2000. The protrusion 2340 may be formed above the ridges 2320, so as to project from the external surface 2000a of the sidewall 2000 in the axial direction of the tire 200.

Figure 3:
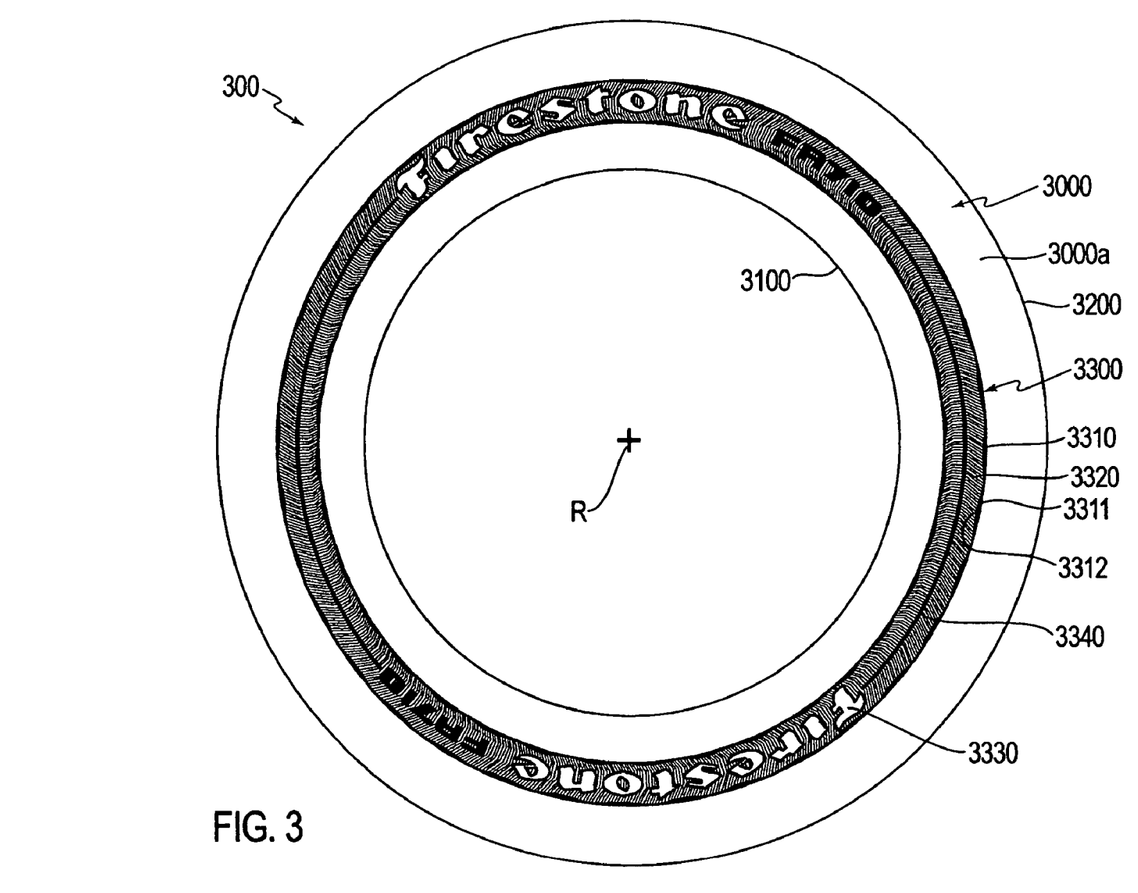
FIG. 3 is a plan view of another exemplary sidewall of a tire.

FIG. 3 is a plan view of an exemplary sidewall of a tire. The tire 300 may include a sidewall 3000 having an external surface 3000a, an inner diameter 3100, an outer diameter 3200, and an annular ring or band 3300 formed on the external surface 3000a of the sidewall 3000. The annular band 3300 may include several types of indicia to help conceal undulations (not shown).

As shown in FIG. 3, the annular band 3300 may be defined by a pair of spaced apart, substantially concentric projecting band edge surfaces 3310 as a type of indicia that may help to conceal the undulations on the external surface 3000a of the sidewall 3000. The band edge surfaces 3310 may project from the external surface 3000a of the sidewall 3000 in an axial direction of rotation R of the tire 300, the central axis of rotation R being perpendicular to a plane of the page in FIG. 1. Each of the band edge surfaces 3310 may be defined by a substantially circular first edge 3311 concentric with the inner diameter 3100 and the outer diameter 3200 of the sidewall 3000, and a substantially sinusoidal second edge 3312. As a result, the band edge surfaces 3310 may include varying widths as measured along radial directions. The radial directions may extend in directions substantially perpendicular to the central axis of rotation R of the tire 300.

As shown in FIG. 3, the annular band 3300 may also include a plurality of spaced apart ridges 3320 as another type of indicia that may help to conceal the undulations on the external surface 3000a of the sidewall 3000. Each ridge 3320 may extend between the band edge surfaces 3310 along the circumference of the annular band 3300. Each ridge 3320 may also project from the external surface 3000a of the sidewall 3000 in the axial direction of the tire 300. Each ridge 3320 may also include a plurality of segments oriented at various angles relative to a radial direction and a shape substantially similar to an adjacent ridge 3320. The lengths of the ridges 3320 may also vary due to the varying distances between the second edges 3312 of the pair of band edge surfaces 3310.

As shown in FIG. 3, the annular band 1300 may also include lettering 3330 as another type of indicia that may help to conceal the undulations on the external surface 3000a of the sidewall 3000. The lettering may extend between the band edge surfaces 3310 along the circumference of the annular band 3300. The lettering 3330 may also project from the external surface 3000a of the sidewall 3000 in the axial direction of rotation R of the tire 300.

The annular band 3300 may also include at least one central concentric protrusion 3340 as another type of indicia that may help to conceal the undulations on the external surface 3000a of the sidewall 3000. The protrusion 3340 may be formed above the ridges 3320, so as to project from the external surface 3000a of the sidewall 3000 in the axial direction of the tire 300.

Figure 4:
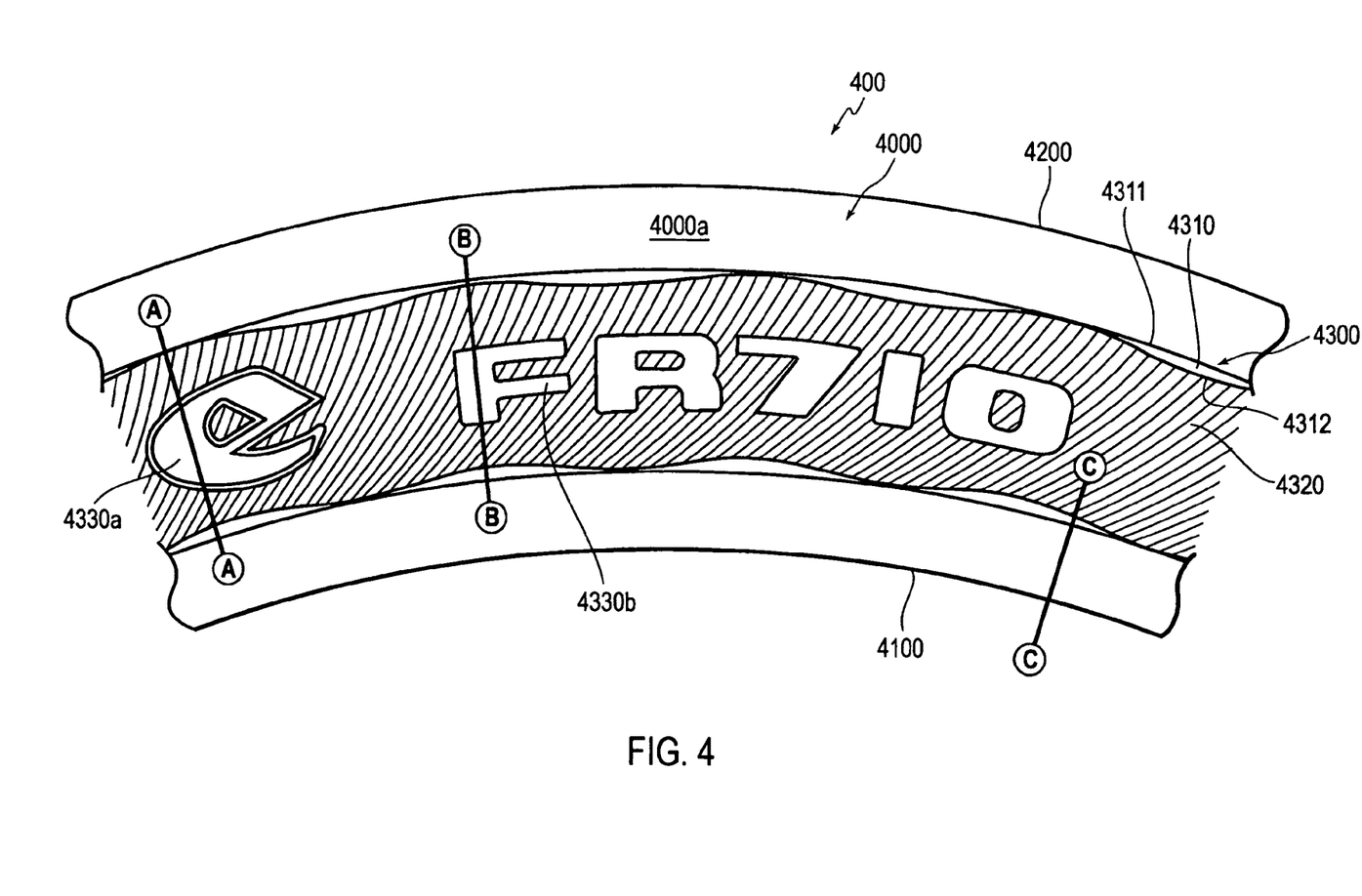
FIG. 4 is a plan view of a portion of another exemplary sidewall of a tire.

FIG. 4 is a plan view of an exemplary sidewall of a tire. The tire 400 may include a sidewall 4000 having an external surface 4000a, an inner diameter 4100, an outer diameter 4200, and an annular ring or band 4300 formed on the external surface 4000a of the sidewall 4000. The annular band 4300 may include several types of indicia to help conceal undulations (not shown).

As shown in FIG. 4, the annular band 4300 may be defined by a pair of spaced apart, substantially concentric projecting band edge surfaces 4310 as a type of indicia that may help to conceal the undulations on the external surface 4000a of the sidewall 4000. The band edge surfaces 4310 may project from the external surface 4000a of the sidewall 1000 in an axial direction of the tire 400, the central axis of rotation R being perpendicular to a plane of the page in FIG. 4. Each of the band edge surfaces 4310 may be defined by a substantially circular first edge 4311 concentric with the inner diameter 4100 and the outer diameter 4200 of the sidewall 4000, and a substantially sinusoidal second edge 4312. As a result, the band edge surfaces 4310 may include varying widths as measured along radial directions. The radial directions may extend in directions substantially perpendicular to the central axis of rotation R of the tire 400.

As shown in FIG. 4, the annular band 4300 may also include a plurality of spaced apart ridges 4320 as another type of indicia that may help to conceal the undulations on the external surface 4000a of the sidewall 4000. Each ridge 4320 may extend between the band edge surfaces 4310 along the circumference of the annular band 4300. Each ridge 4320 may also project from the external surface 4000a of the sidewall 4000 in the axial direction of the tire 400. Each ridge 4320 may also be oriented at an angle relative to a radial direction and substantially parallel to an adjacent ridge 4320. The lengths of the ridges 4320 may also vary due to the varying distances between the second edges 4312 of the pair of band edge surfaces 4310.

As shown in FIG. 4, the annular band 4300 may also include lettering 4330a, 4330b as another type of indicia that may help to conceal the undulations on the external surface 4000a of the sidewall 4000. The lettering may extend between the band edge surfaces 4310 along the circumference of the annular band 4300. The lettering 4330a, 4330b may also project from the external surface 4000a of the sidewall 4000 in the axial direction of the tire 400.

Figure 5:
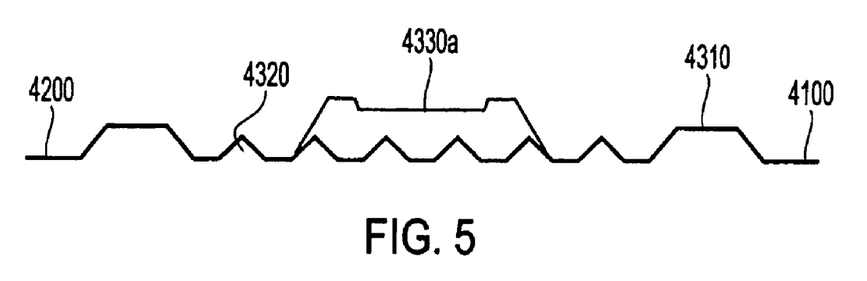
FIG. 5 is a cross-sectional view of the exemplary sidewall of the tire of FIG. 4 taken along line A-A.
Figure 6:
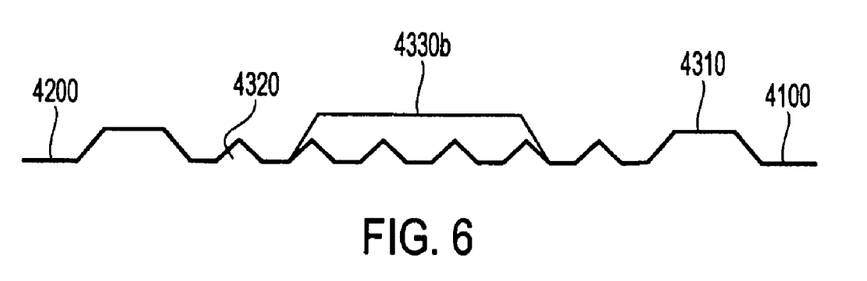
FIG. 6 is a cross-sectional view of the exemplary sidewall of the tire of FIG. 4 taken along line B-B.
Figure 7:
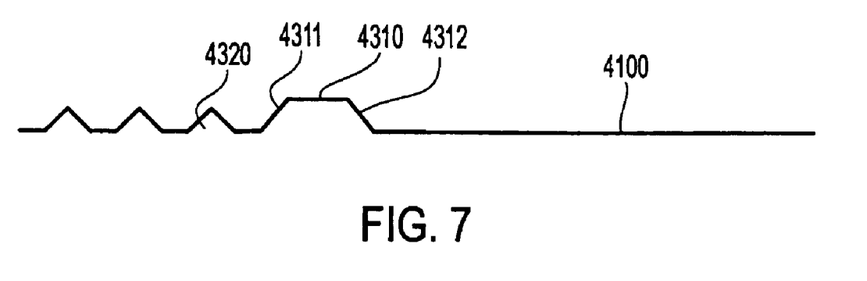
FIG. 7 is a cross-sectional view of the exemplary sidewall of the tire of FIG. 4 taken along line C-C.

FIGS. 5-7 are cross-sectional views of the exemplary sidewall of the tire of FIG. 4. Although FIGS. 5-7 are directed to various cross sections of FIG. 4, it should be appreciated that the description is for ease of understanding and familiarity only, and that the description may be applicable to the tires of FIGS. 1-3 previously discussed above.

FIG. 5 is a cross-sectional view of the exemplary sidewall of the tire of FIG. 4 taken along line A-A. As shown in FIG. 5, an apex of each ridge 4320 may protrude from the external surface 4000a of the sidewall 4000 at a position lower than a top surface of the lettering 4330a, lower than the band edge surfaces 4310, and higher than the inner diameter 4100 and the outer diameter 4200 of the sidewall 4000.

FIG. 6 is a cross-sectional view of the exemplary sidewall of the tire of FIG. 4 taken along line B-B. As shown in FIG. 6, the apex of each ridge 4320 may protrude from the external surface 4000a of the sidewall 4000 at a position lower than a top surface of the lettering 4330b, lower than the band edge surfaces 4310, and higher than the inner diameter 4100 and the outer diameter 4200 of the sidewall 4000.

FIG. 7 is a cross-sectional view of the exemplary sidewall of the tire of FIG. 4 taken along line C-C. As shown in FIG. 7, the band edge surfaces 4310 may be formed above the ridges 4320, and protrude to a position higher than the apex of the each ridge 4320 and the inner diameter 4100 and the outer diameter 4200 of the sidewall 4000.

In FIGS. 5-7, the differences between the protrusion heights of the ridges 4320, the lettering 4330a, 4330b, and the band edge surfaces 4310 may conceal the undulations and enhance the legibility of the indicia. However, it should be appreciated that the protrusion heights of the ridges 4320, the lettering 4330a, 4330b, and the band edge surfaces 4300 may be adjusted to varying heights depending on desired legibility of the indicia. The size and shapes of the ridges of an annular band may also be adjusted to conceal the undulations and enhance the legibility of the indicia.

Figure 8:
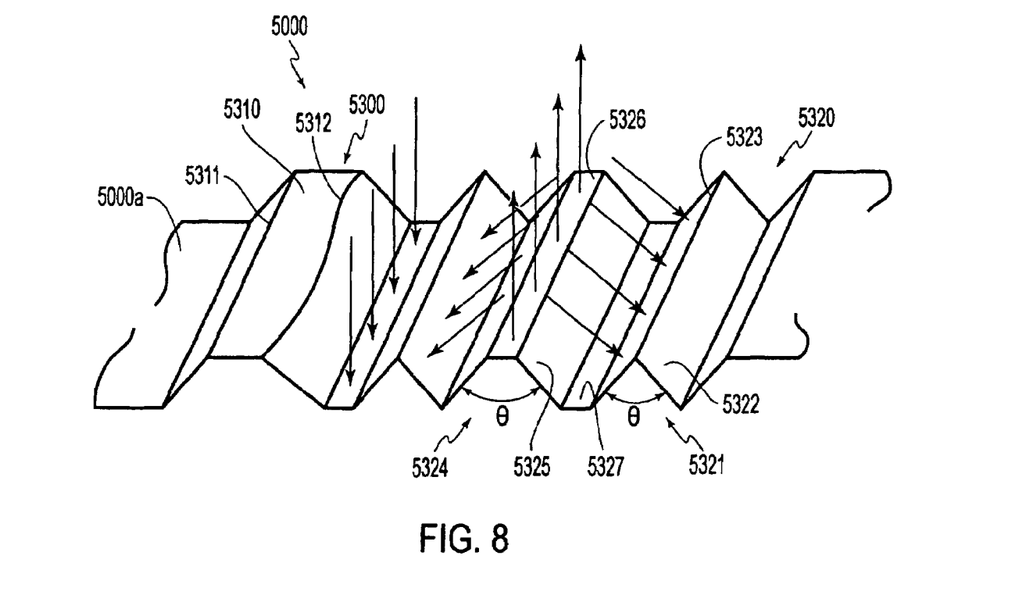
FIG. 8 is a perspective cross-sectional view of a portion of another exemplary sidewall of a tire.

FIG. 8 is a perspective cross-sectional view of a portion of another exemplary sidewall of a tire. As shown in FIG. 8, a tire sidewall 5000 may include an external surface 5000a having a first pattern 5320 of a first cycle of ridges that may be positioned around the circumference of an annular band 5300. The annular band 5300 may include band edge surfaces 5310 defined by a substantially circular first edge 5311 and a substantially sinusoidal second edge 5312. The first pattern may include a plurality of first ridges 5321, each alternating with or separated by one of a plurality of second ridges 5324, and a substantially planar bottom portion 5327 substantially parallel to the external surface of the sidewall 5000.

The first ridges 5321 may each include a substantially triangular cross-section formed by two slanting side surfaces 5322 slanting from an external surface of the tire sidewall 5000 and meeting at an apex 5323. The first ridges 5321 may yield a light deflecting or nonreflective background when viewed along an axial direction of the tire sidewall 5000. The second ridges 5324 may each include a substantially frustoconical shaped cross-section formed by two slanting side surfaces 5325 of substantially identical depths slanting from an external surface of the tire sidewall 5000 and meeting at a substantially planar top surface 5326. The slanting side surfaces 5322 of each of the first ridges 5321 may meet at the apex 5323 to form an angle θ, and the slanting side surfaces 5325 of each of the second ridges 5324 also form a substantially identical angle θ.

The planar top surface 5326 of the second ridge may act as a light-reflecting surface. The first ridge 5321 and the second ridge 5324 may be spaced apart to form the planar bottom surface 5327. The planar bottom surface 5327 may also act as a light reflecting surface to reflect light back along the axial direction to the user viewing the tire.

Figure 9:
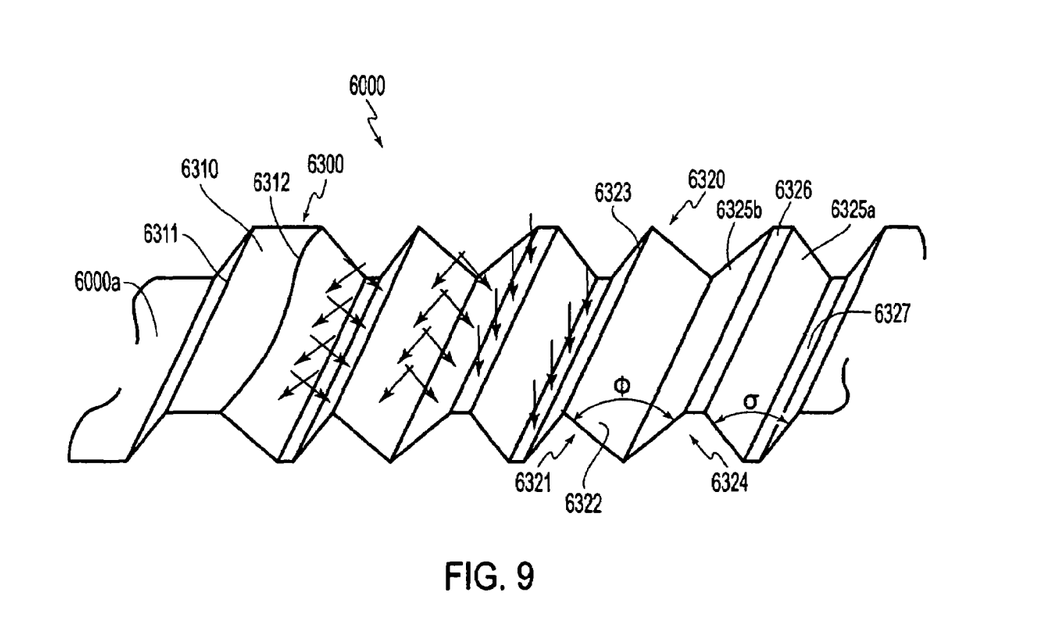
FIG. 9 is a perspective cross-sectional view of a portion of another exemplary sidewall of a tire.

FIG. 9 is a perspective cross-sectional view of a portion of another exemplary sidewall of a tire. As shown in FIG. 9, a tire sidewall 6000 may include an external surface 6000a having a first pattern 6320 of a second cycle of ridges that may be positioned around the circumference of an annular band 6300. The annular band 6300 may include band edge surfaces 6310 defined by a substantially circular first edge 6311 and a substantially sinusoidal second edge 6312. The first pattern may include a plurality of second ridges 6321 each alternating with or separated by one of a plurality of second ridges 6324, and a substantially planar bottom portion 6327 substantially parallel to the external surface of the sidewall 6000.

The first ridges 6321 may each include a substantially triangular cross-section formed by two slanting side surfaces 6322 slanting from an external surface of the tire sidewall 6000 and meeting at an apex 6323. The first ridges 6321 may yield a light deflecting or nonreflective background when viewed along an axial direction of the tire sidewall 6000. The second ridges 6324 may each include a substantially frustoconical shaped cross-section formed by two slanting side surfaces 6325a, 6325b of different depths slanting from an external surface of the tire sidewall 6000 and meeting at a substantially planar top surface 6326. The slanting side surfaces 6322 of each of the first ridges 6321 may meet at the apex 6323 to form an angle φ, and the slanting side surfaces 6325 of each of the second ridges 6324 to form a different angle σ.

By controlling the angles formed by slanting side surfaces of each ridge, angular orientations of the slanting side surfaces may be manipulated to control the light reflective and adsorption properties of the ridges of the sidewalls. As a result, the sidewall undulations may be concealed and the legibility of all types of indicia of the annular bands may be enhanced.

While various details have been described in conjunction with the exemplary implementations outlined above, various alternatives, modifications, variations, improvements, and/or substantial equivalents, whether known or that are or may be presently unforeseen, may become apparent upon reviewing the foregoing disclosure. In particular, the tire designs disclosed herein may be applicable to any of a wide variety of tire applications in addition to passenger vehicles, including cargo trucks, airplanes, subway trains using compliant tires, and military transport vehicles. The designs described herein may be applicable to any system which uses a compliant member on a rotational rigid axle to support a load. Accordingly, the exemplary implementations set forth above, are intended to be illustrative, not limiting.

What is claimed is:

1. A pneumatic tire defining a central axis of rotation, comprising:
a pair of sidewalls radially extending from the central axis of rotation, each of the sidewalls including an inner diameter and an outer diameter defining an external surface, at least one of the sidewalls including an annular band formed on the external surface of the sidewall, the annular band including a pair of spaced apart band edge surfaces, and at least one of the band edge surfaces including a first edge and a sinusoidal second edge, the first edge and the second edge being substantially concentric to the inner diameter and the outer diameter of the sidewall.

2. The pneumatic tire according to claim 1, the annular band further including a plurality of spaced apart ridges of varying lengths protruding from the external surface of the sidewall and radially extending between the pair of spaced apart band edge surfaces.

3. The pneumatic tire according to claim 1, the plurality of ridges being substantially parallel to one another.

4. The pneumatic tire according to claim 1, the plurality of ridges defining a pattern of the ridges including a first ridge, a second ridge differing from the first ridge, and a substantially planar bottom portion being substantially parallel to the external surface of the sidewall.

5. The pneumatic tire according to claim 4, the first ridge defining a substantially triangular cross-sectional shape with an apex formed by a pair of first slanting side surfaces extending from the external surface of the sidewall.

6. The pneumatic tire according to claim 5, the second ridge defining a substantially frustoconical cross-sectional shape formed by an upper planar portion positioned between a pair of second slanting side surfaces extending from the external surface of the sidewall, the upper planar portion being substantially parallel to the external surface of the sidewall.

7. The pneumatic tire according to claim 6, the first slanting side surfaces intersecting at the apex to form a first angle.

8. The pneumatic tire according to claim 7, the second slanting side surfaces forming a second angle substantially equal to the first angle.

9. The pneumatic tire according to claim 7, the second slanting side surfaces forming a second angle different from the first angle.

10. The pneumatic tire according to claim 1, the annular band further including at least one of letters, numerals and characters extending between the pair of spaced apart band edge surfaces.

11. A pneumatic tire defining a central axis of rotation of the tire, comprising:
a pair of sidewalls extending radially from the central axis of rotation, each of the sidewalls including an inner diameter and an outer diameter, at least one of the sidewalls including an annular band formed on an external surface of the sidewall, the annular band including a pair of spaced apart band edge surfaces, and at least one of the band edge surfaces including varying widths as measured in radial directions from the central axis of rotation, and a first edge and a second edge being substantially concentric to the inner diameter and the outer diameter of the sidewall.

12. The pneumatic tire according to claim 11, the annular band further including a plurality of spaced apart ridges of varying lengths protruding from the external surface of the sidewall and radially extending between the pair of spaced apart band edge surfaces.

13. The pneumatic tire according to claim 11, the plurality of ridges being substantially parallel to one another.

14. The pneumatic tire according to claim 11, the plurality of ridges defining a pattern of the ridges including a first ridge, a second ridge differing from the first ridge, and a substantially planar bottom portion being substantially parallel to the external surface of the sidewall.

15. The pneumatic tire according to claim 14, the first ridge defining a substantially triangular cross-sectional shape with an apex formed by a pair of first slanting side surfaces extending from the external surface of the sidewall.

16. The pneumatic tire according to claim 15, the second ridge defining a substantially frustoconical cross-sectional shape formed by an upper planar portion positioned between a pair of second slanting side surfaces extending from the external surface of the sidewall, the upper planar portion being substantially parallel to the external surface of the sidewall.

17. The pneumatic tire according to claim 16, the first slanting side surfaces intersecting at the apex to form a first angle.

18. The pneumatic tire according to claim 17, the second slanting side surfaces forming a second angle substantially equal to the first angle.

19. The pneumatic tire according to claim 17, the second slanting side surfaces forming a second angle different from the first angle.

20. The pneumatic tire according to claim 11, the annular band further including at least one of letters, numerals and characters extending between the pair of spaced apart band edge surfaces.

21. A sidewall of a pneumatic tire defining a central axis of rotation, the sidewall comprising:
an inner diameter;
a larger concentric outer diameter;
an external sidewall surface defined by the inner diameter and the outer diameter;
an annular indicia band formed on the external sidewall surface, the annular band including a pair of spaced apart band edge surfaces, at least one of the band edge surfaces defined by a first edge and a second edge, the at least one of the band edge surfaces including varying widths as measured in radial directions from the central axis of rotation.

22. The sidewall according to claim 21, the annular band further including a plurality of spaced apart ridges of varying lengths protruding from the external sidewall surface and radially extending between the pair of spaced apart band edge surfaces.

23. The sidewall according to claim 21, the plurality of ridges being substantially parallel to one another.

24. The sidewall according to claim 21, the plurality of ridges defining a pattern of the ridges including a first ridge, a second ridge differing from the first ridge, and a substantially planar bottom portion being substantially parallel to the external surface of the sidewall.

25. The sidewall according to claim 24, the first ridge defining a substantially triangular cross sectional shape with an apex formed by a pair of first slanting side surfaces extending from the external surface of the sidewall.

26. The sidewall according to claim 25, the second ridge defining a substantially frustoconical cross sectional shape formed by an upper planar portion positioned between a pair of second slanting side surfaces extending from the external surface of the sidewall, the upper planar portion being substantially parallel to the external surface of the sidewall.

27. The sidewall according to claim 26, the first slanting side surfaces intersecting at the apex to form a first angle.

28. The sidewall according to claim 27, the second slanting side surfaces forming a second angle substantially equal to the first angle.

29. The sidewall according to claim 27, the second slanting side surfaces forming a second angle different from the first angle.

30. The sidewall according to claim 21, the annular band further including at least one of letters, numerals and characters extending between the pair of spaced apart band edge surfaces.

* * * * *